Sept. 11, 1923.                                      1,467,615
                      G. W. FAIRBANKS
              SELF CLOSING AND CLEANING DRAIN VALVE
                      Filed May 2, 1921

INVENTOR.
GEORGE W. FAIRBANKS
BY
ATTORNEYS.

Patented Sept. 11, 1923.

1,467,615

UNITED STATES PATENT OFFICE.

GEORGE W. FAIRBANKS, OF PENDLETON, OREGON, ASSIGNOR OF ONE-HALF TO N. E. McDERMUT, OF PENDLETON, OREGON.

SELF CLOSING AND CLEANING DRAIN VALVE.

Application filed May 2, 1921. Serial No. 465,950.

*To all whom it may concern:*

Be it known that I, GEORGE W. FAIRBANKS, a citizen of the United States, residing at Pendleton, in the county of Umatilla and State of Oregon, have invented certain new and useful Improvements in Self Closing and Cleaning Drain Valves, of which the following is a specification.

This invention relates to valves, of the self closing type, and has for its object to provide a valve that is simple to construct and that is cheap to manufacture.

A further object of the invention is to provide a valve that may be operated from a distance and that is self closing.

A further object of the invention is to provide a valve that is peculiarly adaptable to the crank cases of Fords and of other internal combustion engines, that may be conveniently operated though in an inaccessible position.

A further object of the invention is to provide a valve having a simple self closing means which cannot get out of order.

A further object of the invention is to provide a valve that will not become obstructed with mud or dust and that has a self-cleaning means operable and effective with its operation.

With these and other objects in view reference is now had to the accompanying drawings in which—

Figure 1:
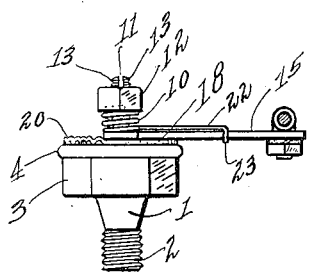
Fig. 1 is a side elevation of the valve.
Figure 2:
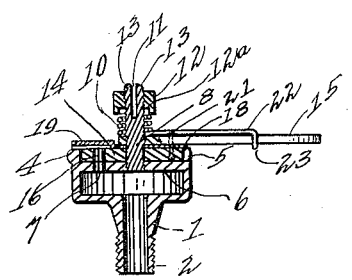
Fig. 2 is a sectional elevation of the valve.
Figure 5:
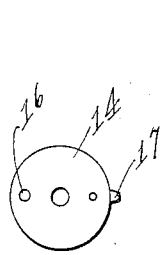
Fig. 5 is a plan view of the valve disc.
Figure 3:
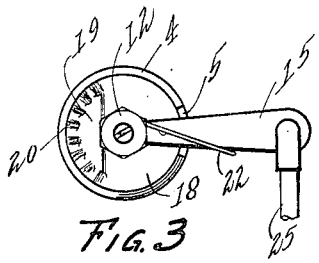
Fig. 3 is a plan view of the valve.
Figure 4:
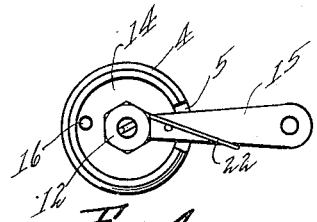
Fig. 4 is a plan view of the valve with the cleaning means removed.
Figure 6:
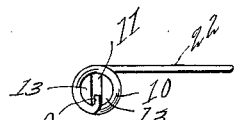
Fig. 6 is a plan view of the spring and stem showing the method of fastening the spring.
Figure 7:
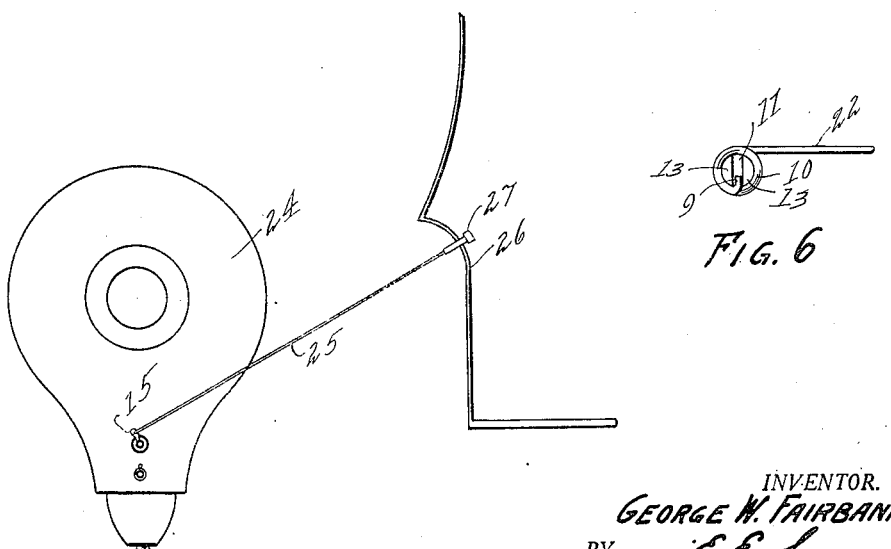
Fig. 7 is an end elevation of a crank case and dust shield of an automobile showing the application of the valve.

Having reference to the drawings like numerals refer to like parts throughout and the numeral 1 refers to the body portion of the valve which is provided with a threaded stem 2, and formed at its upper part 3 to accommodate a wrench, for threaded engagement with the receptacle with which it will be used.

The body portion is finished on its upper side with a rim 4 carrying a recess 5, the rim forming a depression which is flattened to be utilized as a valve seat 6 and in which is provided an orifice 7 to serve as an outlet to the valve.

Rigidly attached to the valve seat is a stem 8 on which is mounted the operative parts which will be presently explained.

In the stem a novel combination of means is presented wherewith to hold the stationary end 9 of the spring 10 rigidly in the slot 11 by means of the nut 12, and to apply a tension to the nut to prevent its accidental removal.

The stem is slotted to receive the end of the spring. By slotting the stem a pair of yielding parts 13—13 remain which presents a yielding pressure, or tension, against the nut, and thus will prevent its accidental removal; likewise, the spring being under compression presents a tension to the under side of the nut, similar to that of a lock washer, which will also prevent its accidental removal; hence the yielding members formed by the slot holds the nut, the nut holds the spring in place in the slot, the spring assists the yielding members to hold the nut, and the slot holds the spring in place as against its accidental rotation. For this purpose the nut may be recessed at 12ª to cover the first coil of the spring and maintain the stationary end 9 in engagement with the slot.

The body portion of the valve is preferably made of metal but the disc valve 14, which is rotatable, may be constructed from a cheap material such as fiber, leather, or the like, which from its nature would make the valve easy to manufacture.

The valve is positioned within the rim 4 in rotatable contact with the seat 6 and is rotated by means of the lever handle 15. In the valve is an orifice 16 which is registerable with the orifice 7 in the valve seat by the movement of the disc valve, the valve being in the open position when the two orifices are in register.

To maintain perfect alignment of the orifices the stop 17 is provided on the disc valve which is movable therewith in the recess 5 within the sidewalls thereof.

A cleaning disc 18 is rotatably mounted on the stem and is riveted or otherwise rigidly attached to the disc valve to rotate therewith, and is provided with a raised portion 19 terminating at the outer edge of this disc in corrugations 20. The raised portion is elevated above the orifice 16 to provide an outlet for the oil. Now, these corrugations being of small extent, will clog easily with dust or mud, but the small amount of dust lodged therein will easily be removed, hence, as the disc is in contact with the rim 4, the movement of the disc, or more particularly the corrugations thereof, against the rim will provide a certain vibration sufficient to jar the dirt free from the disc, thus each movement of opening or closing the valve will clean the outlet thereof.

The valve is operated by a lever handle 15 which is also rotatably mounted on the stem and rigidly attached to the disc valve, and cleaning disc, by the rivet 21, passed therethrough. The spring 10 has an extended arm 22 terminating in a hook 23 wherewith to engage the lever handle to yieldingly return it to the closed position.

In use the valve is screwed into the receptacle, such as the crank case 24 of an engine, and an extension rod 25 connected to the lever operating handle 15. The extension rod is now passed through the dust shield 26 and finished with a knob 27. Now, by drawing out the knob the valve is cleaned and opened and oil flowing therefrom will be visible evidence that there is oil in the crank case.

By releasing the knob the valve is yieldingly closed, in which position it will obviously remain without danger of accidental opening.

Having thus described my invention, I claim—

1. In a self closing and cleaning drain valve, the combination of a rimmed body portion, provided with a depressed valve seat having an orifice therein, the rim of said body portion carrying a recess, a threaded stem rigidly attached to said seat, a disc valve rotatably mounted on said stem in slidable engagement with said seat, a stop extending from said disc and operable in said recess, said valve being provided with an orifice registerable with the first mentioned orifice, a cleaning means attached to and operable with said disc valve, and a means to yieldingly maintain said valve in a closed position.

2. In a self closing and cleaning drain valve comprising, in combination, a rimmed body portion, provided with a depressed valve seat having an orifice therein, the rim of said body portion carrying a recess, a stem rigidly attached to said seat, a disc valve rotatably mounted on said stem and positioned in slidable engagement with said seat, a stop attached to said disc and operable in said recess, said disc valve being provided with an orifice registerable with the first mentioned orifice, a cleaning disc rotatably mounted on said stem, said disc having a corrugated edge, a spring attached to said stem, a lever operating handle, said handle being attached to and operable with said valve and said cleaning disc, and means to yieldingly maintain said valve in a closed position.

In testimony whereof I affix my signature.

GEORGE W. FAIRBANKS.